(12) United States Patent
Finchelstein et al.

(10) Patent No.: US 11,727,115 B2
(45) Date of Patent: Aug. 15, 2023

(54) SECURED COMPUTER SYSTEM

(71) Applicant: KAZUAR ADVANCED TECHNOLOGIES LTD., Tel-Aviv (IL)

(72) Inventors: Daniel Mondy Finchelstein, Rishon Lezion (IL); Yuval Moshe Porat, Tel Aviv-Jaffa (IL); Shlomi Raz Marco, Alfei Menashe (IL); Erez Gal-Betzer, Rehovot (IL)

(73) Assignee: KAZUAR ADVANCED TECHNOLOGIES LTD., Tel-Aviv (IL)

( * ) Notice: Subject to any disclaimer, the term of this patent is extended or adjusted under 35 U.S.C. 154(b) by 378 days.

(21) Appl. No.: 17/041,122

(22) PCT Filed: Mar. 26, 2019

(86) PCT No.: PCT/IL2019/050343
§ 371 (c)(1),
(2) Date: Sep. 24, 2020

(87) PCT Pub. No.: WO2019/186546
PCT Pub. Date: Oct. 3, 2019

(65) Prior Publication Data
US 2021/0117546 A1   Apr. 22, 2021

(30) Foreign Application Priority Data
Mar. 26, 2018   (IL) .......................................... 258368

(51) Int. Cl.
*G06F 21/57* (2013.01)
*G06F 21/53* (2013.01)
(Continued)

(52) U.S. Cl.
CPC ............ *G06F 21/575* (2013.01); *G06F 21/53* (2013.01); *G06F 21/602* (2013.01)

(58) Field of Classification Search
CPC ...... G06F 21/575; G06F 21/53; G06F 21/602; G06F 12/109; G06F 2212/1052;
(Continued)

(56) References Cited

U.S. PATENT DOCUMENTS

| 2011/0047376 A1 | 2/2011 | Mittal |
| 2012/0233472 A1 | 9/2012 | Faraboschi et al. |

(Continued)

OTHER PUBLICATIONS

Introduction to Intel® SGX Sealing, downloaded from https://software.intel.com/en-US/blogs/2016/05/04/introduction-to-intel-sgx-sealing May 4, 2016.
(Continued)

*Primary Examiner* — Michael J Brown
(74) *Attorney, Agent, or Firm* — Browdy and Neimark

(57) ABSTRACT

There is provided a secured computer system, comprising a processing and memory unit (PMU) operatively connected to an input peripheral and an output peripheral. The PMU comprises a system memory comprising a protected memory and a shared memory, and a processor operatively coupled to the system memory, the processor including a set of instructions for enabling secure data storage and execution via the protected memory. The PMU further comprises an operating system and a group of modules executable by the operating system, each module in the group of modules having a designated secure region to be executed within the protected memory, the group of modules is configured to create authentication and share the input data securely via the shared memory accessible thereto using a composite key, the composite key generated within the group using data sharing mechanism between the designated secure regions enabled by the set of instructions.

20 Claims, 9 Drawing Sheets

(51) Int. Cl.
 *G06F 21/60* (2013.01)
 *H04L 9/08* (2006.01)
 *G06F 12/14* (2006.01)

(58) Field of Classification Search
 CPC ......... G06F 2212/152; G06F 2212/656; G06F 12/0284; G06F 12/1408; G06F 12/1441; H04L 2209/127; H04L 9/0838; H04L 9/0894
 USPC .................................................. 713/1, 2, 100
 See application file for complete search history.

(56) References Cited

U.S. PATENT DOCUMENTS

| | | |
|---|---|---|
| 2013/0179685 A1 | 7/2013 | Weinstein et al. |
| 2013/0232344 A1 | 9/2013 | Johnson et al. |
| 2013/0238907 A1 | 9/2013 | Debout et al. |
| 2016/0292460 A1 | 10/2016 | Boysen et al. |
| 2016/0359836 A1 | 12/2016 | Horgan et al. |
| 2017/0288875 A1 | 10/2017 | Xing |
| 2018/0139046 A1* | 5/2018 | Brueckner ................ H04L 9/14 |
| 2018/0248692 A1* | 8/2018 | Henderson ............ H04L 9/0869 |

OTHER PUBLICATIONS

Readers-writer lock, downloaded from en.wikipedia.org/wiki/Readers%E2%80%93writer_lock (Mar. 4, 2018).

Circular buffer, downloaded from en.wikipedia.org/wiki/Circular_buffer (Mar. 4, 2018).

Code Sample: Intel® Software Guard Extensions Remote Attestation End-to-End Example, downloaded from software intel.com/content/www/us/en/develop/articles/code-sample-intel-software-guard-extensions-remote-attestation-end-to-end-example.html (Mar. 8, 2018).

\* cited by examiner

SECURED COMPUTER SYSTEM

TECHNICAL FIELD

The presently disclosed subject matter relates, in general, to the field of computer systems, and more specifically, to secured computer systems.

BACKGROUND

Computer devices and computer networks are increasingly under attack from malicious sources. While the security industry has made rapid progress in security products, bath in terms of novelty, efficiency, feature set and overall approach to security, organizations continue to be breached at an alarming rate and with increased sophistication, and may need to invest significant resources attempting to detect and mitigate such attacks.

Existing computer security solutions aim at either preventing or detecting a compromise. However, once the computer system is compromised and under ongoing compromise, current solutions do not typically provide any additional security procedures for enabling users to work under such circumstances.

GENERAL DESCRIPTION

In accordance with certain aspects of the presently disclosed subject matter, there is provided a secured computer system, comprising: a processor and memory unit (PMU) operatively connected to an input peripheral component and an output peripheral component, wherein the input peripheral component is configured to receive input data from a user and send the input data to the PMU; the output peripheral component is configured to receive processed output data from the PMU; the PMU comprises a system memory comprising a protected memory and a shared memory, and a processor operatively coupled to the system memory, the processor including a set of instructions for enabling secure data storage and execution via the protected memory; the PMU further comprises an operating system and a group of modules executable by the operating system, each module in the group of modules having a designated secure region to be executed within the protected memory, the group of modules configured to create authentication and share the input data securely via the shared memory accessible hereto using a composite key, the composite key generated within the group using a data sharing mechanism between the designated secure regions enabled by the set of instructions; wherein the group of modules comprises: at least one writer module configured to receive the input data from the input peripheral component, encrypt the input data using the composite key and write the encrypted input data to the shared memory; and at least one reader module configured to read the encrypted input data from the shared memory, decrypt the encrypted input data using the composite key and use the decrypted input data.

In addition to the above features, the system according to this aspect of the presently disclosed subject matter can comprise one or more of features (i) to (xvi) listed below, in any desired combination or permutation which is technically possible:

(i). The processor can support secure enclaves and the set of instructions can include a plurality of secure enclave instructions, and wherein the designated secure region is a secure enclave.

(ii). The at least one reader module can be selected from a group comprising: a state manager module configured to monitor state of environment in the operating system; a secure environment module configured to transfer the input data securely through remote connection to a remote working environment and receive processed output data securely from the remote working environment; and an output manager module configured to provide the processed output data to the output peripheral component.

(iii). Each given module in the group can be configured to generate the composite key by: generating a key component for a specific session in a secure enclave designated thereto and store the key component in the designated secure enclave; securely exchanging, using sealing and unsealing mechanism of the secure enclave, the key component within the group via the shared memory so as to obtain respective key components from other modules in the group; and independently generating, in the designated secure enclave, the composite key using the respective key component from each module within the group, thereby allowing secure data communication within the group by using the composite key.

(iv). The designated secure enclaves can be associated with a signing identity of an authority entity that signs the secure enclaves. Each given module in the group can be configured to securely exchange the key component by: sealing the key component and copying the sealed key component to the shared memory, copying respective sealed key components of other modules from the shared memory to the designated secure enclave, and unsealing the respective sealed key components. A successful unsealing operation by the given module provides validity authentication.

(v). The at least one writer module can be further configured to coordinate phases during generation of the composite key.

(vi). The input peripheral component can be a secure keyboard configured to receive and encrypt input key strokes from the user and send the encrypted input data to the PMU.

(vii). The output peripheral component can be a secure display configured to receive encrypted processed output data from the PMU and decrypt the encrypted processed output data to render for display.

(viii). The shared memory can be represented by a secure ring cache which each module in the group can independently access therefrom.

(ix). A new composite key can be generated upon a new module joining the group or upon lapse of a period of time.

(x). The at least one writer module can be configured to use a session monotonic counter whose value is expected to advance forward only when writing new input data. Each of the at least one reader module can be configured to store a local copy of the session monotonic counter on every reading session and upon a new reading session, read a current value of the session monotonic counter and compare it with a previous stored value.

(xi). The composite key can be verified by a given module upon a successful read of the given module from the shared memory using the composite key.

(xii). The system can further comprise a virtualized local environment module executable by the operating system, wherein state of the operating system is switchable between a secure environment provided by the secure environment module and a virtualized local environment provided by the virtualized local environment module.

(xiii). The system can further comprise a physical indicator embedded on the secured computer device and configured to provide a physical indication upon a switch between the virtualized local environment and the secure environment.

(xiv). The system can further comprise a physical switch embedded on the secured computer device configured to receive an instruction of switching environment from a user, and trigger a switch between the virtualized local environment and the secure environment.

(xv). The physical indicator can be a visual indicator embedded on the input peripheral component and configured to give visual indication upon receiving a notification of a successful switch.

(xvi). The system can further comprise a BIOS component configured to perform verification in order to determine whether or not to boot the operating system.

In accordance with other aspects of the presently disclosed subject matter, there are also provided one or more computerized methods for implementing or operating some or all the aspects of the secured computer system, and this aspect of the disclosed subject matter can comprise one or more of features (i) to (xvi) listed above with respect to the system, mutatis mutandis, in any desired combination or permutation which is technically possible.

In accordance with other aspects of the presently disclosed subject matter, there is provided a non-transitory computer readable storage medium tangibly embodying a program of instructions that, when executed by a computer, cause the computer to perform one or more computerized methods for implementing or operating some or all the aspects of the secured computer system, and this aspect of the disclosed subject matter can comprise one or more of features (i) to (xvi) listed above with respect to the system, mutatis mutandis, in any desired combination or permutation which is technically possible.

BRIEF DESCRIPTION OF THE DRAWINGS

In order to understand the invention and to see how it may be carried out in practice, embodiments will now be described, by way of non-limiting example only, with reference to the accompanying drawings, in which.

DETAILED DESCRIPTION OF EMBODIMENTS

Figure 1A:
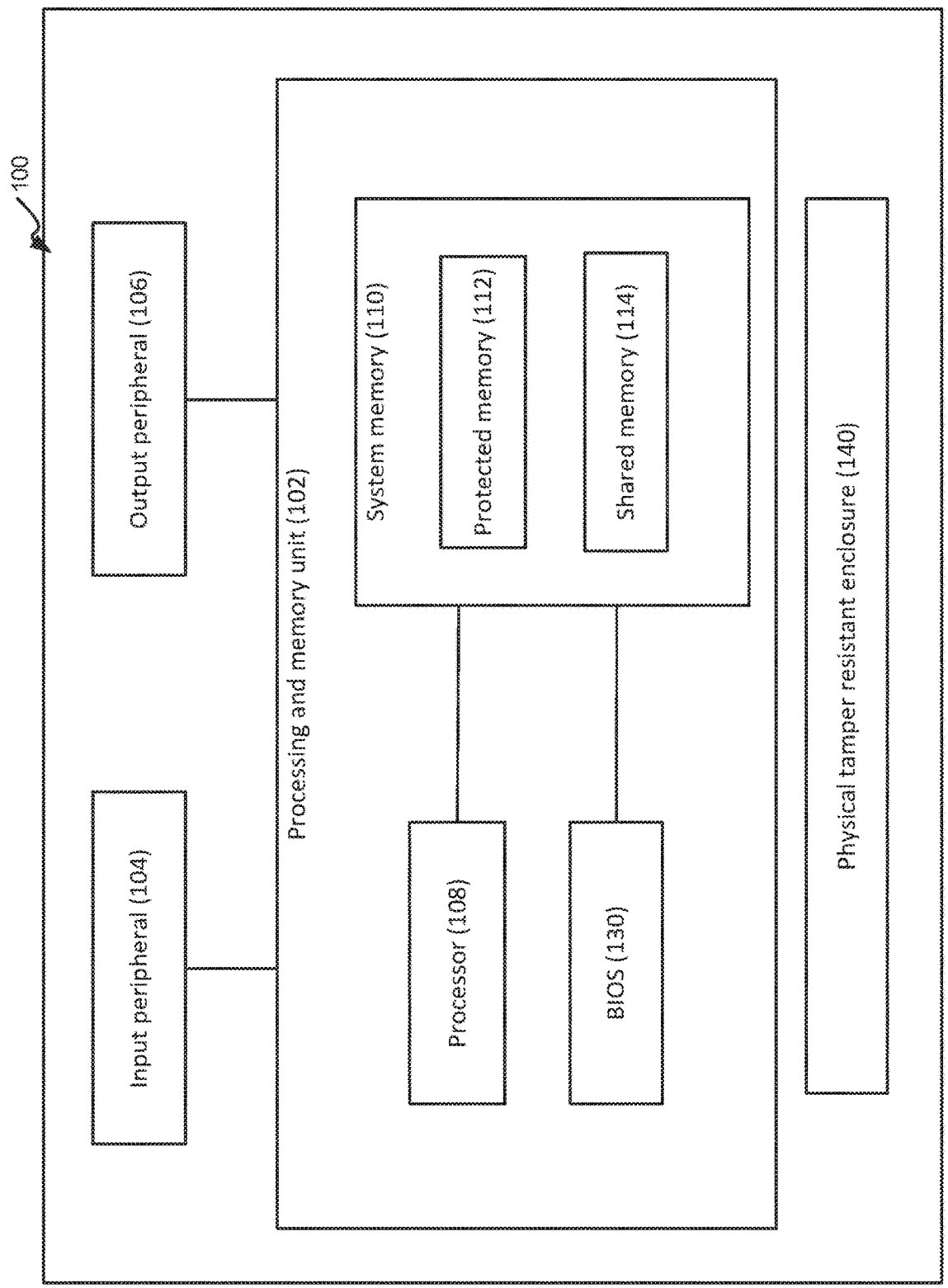
FIG. 1a illustrates a schematic block diagram of a secured computer system in accordance with certain embodiments of the presently disclosed subject matter.

In the following detailed description, numerous specific details are set forth in order to provide a thorough understanding of the invention. However, it will be understood by those skilled in the art that the presently disclosed subject matter may be practiced without these specific details. In other instances, well-known methods, procedures, components and circuits have not been described in detail so as not to obscure the presently disclosed subject matter.

Unless specifically stated otherwise, as apparent from the following discussions, it is appreciated that throughout the specification discussions utilizing terms such as "receiving", "enabling", "sending", "displaying", "creating", "sharing", "using", "encrypting", "writing", "reading", "decrypting", "monitoring", "transferring", "providing", "generating", "sealing", "unsealing", "exchanging", "storing", "signing", "coordinating", "verifying", "switching", "performing", or the like, refer to the action(s) and/or process(es) of a computer that manipulate and/or transform data into other data, said data represented as physical, such as electronic, quantities and/or said data representing the physical objects. The term "computer" should be expansively construed to cover any kind of hardware-based electronic device with data processing capabilities including, by way of non-limiting example, the secured computer system and parts thereof, as well as the processing and memory unit (PMU) and processor comprised therein as disclosed in the present application.

The terms "non-transitory memory" and "non-transitory storage medium" used herein should be expansively construed to cover any volatile or non-volatile computer memory suitable to the presently disclosed subject matter.

Embodiments of the presently disclosed subject matter are not described with reference to any particular programming language. It will be appreciated that a variety of programming languages may be used to implement the teachings of the presently disclosed subject matter as described herein.

As used herein, the phrase "for example," "such as", "for instance" and variants thereof describe non-limiting embodiments of the presently disclosed subject matter. Reference in the specification to "one case", "some cases", "other cases" or variants thereof means that a particular feature, structure or characteristic described in connection with the embodiment(s) is included in at least one embodiment of the presently disclosed subject matter. Thus the appearance of the phrase "one case", "some cases", "other cases" or variants thereof does not necessarily refer to the same embodiment(s).

It is appreciated that, unless specifically stated otherwise, certain features of the presently disclosed subject matter, which are described in the context of separate embodiments, can also be provided in combination in a single embodiment.

Conversely, various features of the presently disclosed subject matter, which are described in the context of a single embodiment, can also be provided separately or in any suitable sub-combination. In the following detailed description, numerous specific details are set forth in order to provide a thorough understanding of the methods and apparatus.

Bearing this in mind, attention is drawn to FIG. 1a in illustrating a schematic block diagram of a secured computer system in accordance with certain embodiments of the presently disclosed subject matter.

The system 100 illustrated in FIG. 1 is a secured computer device (also referred to herein as secure computer device) comprising a processing and memory unit (PMU) 102 operatively connected to an input peripheral component (also referred to herein as input peripheral) 104 and an output peripheral component (also referred to herein as output peripheral) 106.

According to certain embodiments, the input peripheral 104 is an input device configured to receive input data from a user and send the input data to the PMU 102. Non-limiting examples of input devices can include keyboards, pointing devices (such as, e.g., mouse, touch pad, pointing sticks, touch screen, track ball, etc.), and media input devices (such as, e.g., digital cameras, scanners, webcam, recorder, etc.). It is to be noted that the present disclosure is not limited to a specific type of input device and any suitable input device(s) can be utilized herein for the purpose of providing input data.

In some embodiments, the input peripheral 104 can be a secure keyboard configured to receive and encrypt input key strokes from the user and send the encrypted input data (also referred to herein as secure input data) to the PMU. In one embodiment, the secure keyboard can comprise a keyboard controller (e.g., a processor) that is configured to apply keystroke encryption algorithms to the input key strokes for the purpose of preventing keylogging attacks. By way of example, either a symmetric or asymmetric encryption scheme can be used, such as, e.g., RSA, AES, SHA, OTP, and any other suitable algorithms. By way of example, a symmetric cryptographic key can be shared between the input peripheral and a receiving module an input manager module) for both encryption of the input key strokes and decryption of the encrypted data.

According to certain embodiments, the output peripheral 106 is an output device configured to receive processed output data from the PMU. Non-limiting to examples of output devices can include visual display devices (such as, e.g., screens, monitors, etc.), sound output devices (such as, speakers, headphones, etc.), and printers, etc. It is to be noted that the present disclosure is not limited to a specific type of output device and any suitable output device(s) can be utilized herein for the purpose of providing output data.

In some embodiments, the output peripheral 106 can be a secure display configured to receive encrypted processed output data from the PMU and decrypt the encrypted processed output data to render for display.

PMU 102 is configured to provide all processing necessary for operating system 100 as further detailed below with reference to FIGS. 4-6. PMU 102 comprises a processor 108 and a system memory 110 operatively coupled thereto. In some embodiments, the system memory 110 can refer to memory that can be directly accessible to the processor. The processor can be configured to read instructions stored thereon and execute them as required. According to certain embodiments, the system memory 110 can comprise a protected memory 112 and a shared memory 114. In particular, the processor can include or be associated with a set of instructions for enabling secure data storage and execution via the protected memory. In certain embodiments, the protected memory can be implemented as a separated and encrypted region in the system memory. It is to be appreciated that the implementation details may vary in different platforms and architectures. It is also to be noted that the term processor referred to herein should be expansively construed to cover any processing circuitry with data processing capabilities, and the present disclosure is not limited to the type or platform thereof, or number of processing cores comprised therein.

In some embodiments, a secure enclave (also referred to herein as SE or enclave) is a trusted execution environment embedded in an application or process which provides a secure region (e.g., separated and encrypted) for the application to execute code and store data inside in the context of an OS process. The secure enclave can be executed, for example, from an Enclave Page Cache (EPC) in which data is to be protected using access control mechanisms to be provided by the processor associated with secure enclave instructions. An EPC can be where enclave code is executed and protected enclave data is accessed. The EPC can be located within the physical address space of a platform but can be accessed only using SE instructions. By way of example, an EPC can be implemented as the protected memory 112 or part thereof. The EPC can contain pages from many different enclaves and provides an access control mechanism to protect the integrity and confidentiality of the pages. The page cache can maintain a coherency protocol similar to the one used for coherent physical memory in the platform. The enclave pages can be loaded into the EPC by an OS. The secure enclaves are described in further detail below with reference to FIG. 2.

In some embodiments, the processor 108 can be a processor that supports secure enclaves. In some embodiments, the processor supporting secure enclaves can utilize Intel Software Guard Extensions (SGX). SGX is a new mode of execution on a processor with corresponding memory protection semantic and instructions to be used for management. SGX can create secure enclaves by filling protected memory pages with desired code and data, locking the code and data in the enclaves, and performing measurement therein. The processor can execute the code inside the enclave. No other entities, including the kernel (ring 0) or hypervisor (ring "−1"), or SMM (ring "−2") or AMT (ring "−3"), have the right to read nor write the memory pages belonging to the enclave. In some embodiments, the processor supporting secure enclaves can utilize, for example, Advanced. Micro Devices memory encryption technology.

The processor supporting secure enclaves (also referred to herein as secure-enclave supporting processor) can be recognized as having an instruction set architecture including a plurality of secure enclave instructions for enabling secure data storage and execution using secure enclaves.

For purpose of illustration only, certain embodiments of the following description are provided with respect to SGX and secure enclaves. Embodiments are, likewise, applicable to other platforms and/or vendor's technologies that can be used to implement similar data security and access control mechanisms, such as, e.g., AMD and ARM (e.g., TrustZone).

The PMU can further comprise a Basic Input/Output System (BIOS) component 130 configured to perform hardware initialization during the booting process (power-on startup), and to provide runtime services for operating systems and programs. In one embodiment, the BIOS 130 can be implemented as a firmware pre-installed on a computer's system board. It is to be noted that the BIOS as referred to herein should be broadly construed to cover any kind of system initialization and pre-boot environment tool, and the present disclosure should not be limited by different implementations and designs thereof.

In some cases, Unified Extensible Firmware Interface (UEFI) can be used as an improved version of BIOS. UEFI may be stored in flash memory on the motherboard or loaded from another storage device. UEFI can support, e.g., Secure Boot, or measured Boot, etc., which means the operating system can be checked for validity to ensure no malware has tampered with the boot process. Other methods can also be used to verify validity of boot and/or pre-boot environment, which can use a TPM and/or HSM device to facilitate validity verification. It can support networking features right in the UEFI firmware itself so that advanced authentication and validation can be carried out (such as, e.g., token base remote approved boot, boot permission revocation, etc.).

In certain embodiments, the BIOS component 130 (such as, e.g., UEFI or any other pre-boot environment tool) can be configured to provide verification of authenticity of the user, the authorization of the current user and session, and the validity of the about-to-boot operating system etc. This is for the purpose of providing security measures which in some cases can be cryptographically-backed even before the operating system boots. In one embodiment, the BIOS can be configured to perform verification in order to determine whether or not to boot the operating system. By way of example, the BIOS can be configured to verify if there is an Internet connection to a remote environment, such as, cloud environment, and may determine to boot the OS only if there is valid connection. Additionally, if there is valid connection, the BIOS may further request for a token to be used for booting the OS. By way of another example, the BIOS can be configured to enforce GPS location verifications, such that the OS will boot (or not boot) within certain geographical boundaries. By way of yet a further example, the BIOS can be configured to carry out the booting process only if an approval by an organization is granted. There can be multiple states in which the operating system may function based on the level of approval being granted.

According to certain embodiments, the secure computer system 100 can comprise a storage unit (not illustrated in the figure) which can be configured to store any data necessary for operating system 100. The storage unit can provide secondary storage to the system and can include, e.g., hard disks, flash memory, etc. System 100 can also comprise a Graphical User Interface (GUI) which is configured to enable user-specified inputs and render outputs related to system 100.

In some embodiments, the secure computer device 100 can be further enhanced in the physical security aspect. By way of example, the secure computer device can be equipped with physical tamper resistant enclosure 140 (as shown in FIG. 1a). For instance, the outer casing of the computer device can be tamper proof based on the industry's practices and standards, such as, e.g., FIPS 140-2 level 4, so as to provide protection against, for example, physical inspection or disassembly of the device and provide additional protection for the data in case such an attempt is being made. Additionally or alternatively, one or more hardware switches can be introduced to control access to certain peripherals which may be exploited without user intervention or intention (such as, e.g., camera, microphone, wireless/Bluetooth component, etc.). Additionally or alternatively, the secure computer device can be equipped with a thermal/electrical noise generator, which can be a physical micro-unit generating random physical noise (such as, e.g., heat deviation, electrical flux, RF noise, acoustic, etc.) for the purpose of preventing side channel attacks. Additionally or alternatively, the physical tamper resistant enclosure 140 can further comprise a circuit configured to receive input from the enclosure (e.g., the outer casing, hardware switches, etc.), determine if there is any tampering event, and provide protection measures accordingly.

It is to be noted that the secure computer device 100 can be any type of stand-alone computer device, such as, e.g., a laptop, desktop, etc. Although it is illustrated in FIG. 1a that the input peripheral 104 and output peripheral 106 are integrated as part of the computer device 100, it is to be understood that in some cases, these components can be implemented as separated units and can be operatively connected to the computer device.

Those versed in the art will readily appreciate that the teachings of the presently disclosed subject matter are not bound by the system illustrated in FIG. 1a; equivalent and/or modified functionality can be consolidated or divided in another manner and can be implemented in any appropriate combination of software with firmware and hardware.

Figure 1B:
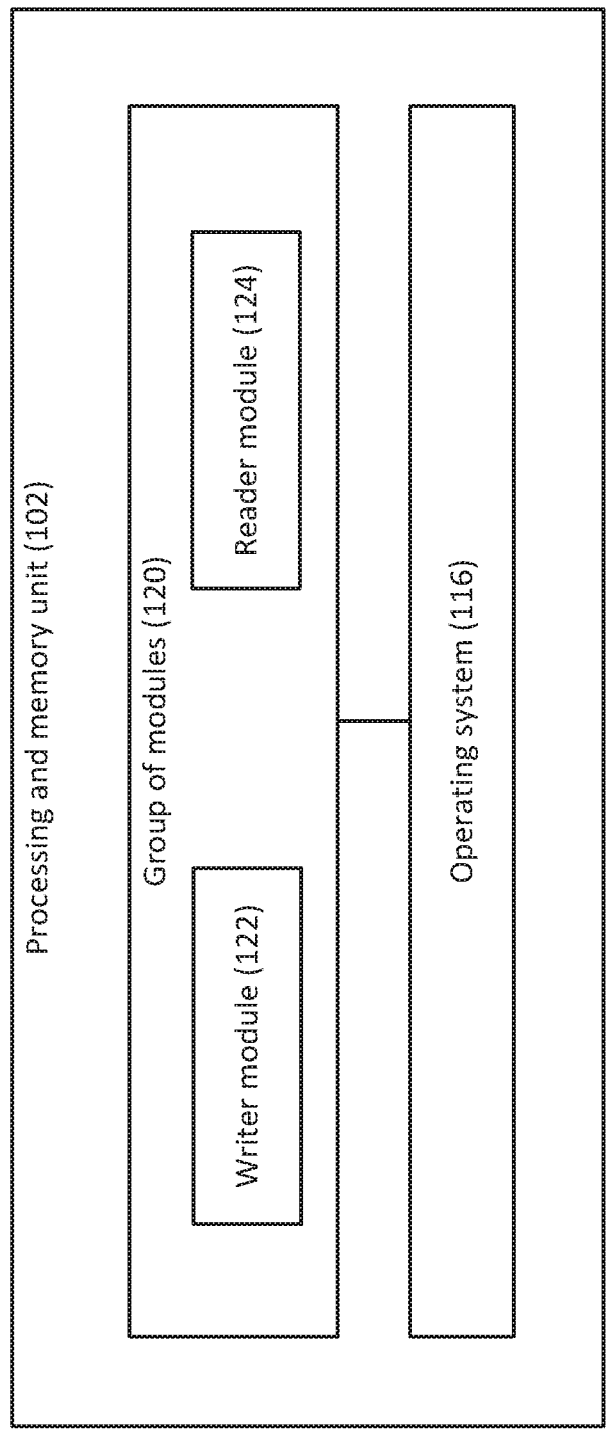
FIG. 1b illustrates a schematic block diagram of functional components comprised in a PMU of a secured computer system in accordance with certain embodiments of the presently disclosed subject matter.

Turning now to FIG. 1b, there is illustrated a schematic block diagram of functional components comprised in a PMU of a secured computer system in accordance with certain embodiments of the presently disclosed subject matter.

The processor 108 can be configured to execute several functional components/modules in accordance with computer-readable instructions implemented on a non-transitory computer-readable memory comprised in the system memory 110. Such functional modules are referred to hereinafter as comprised in the PMU 102.

Functional components comprised in the PMU 102 can comprise an operating system (OS) 116 and a group of modules 120 executable by the operating system 116. The OS 116 can be a secure base OS which can comprise a trimmed down/stripped down version of Linux kernel together security enhancing extensions (e.g., SELinux, GRSec). In some embodiments, BSD derived kernel/userland can be used and evaluated, as well as further secure features such as, e.g., capsicom, pledge, etc. In such base OS, each component that does not have direct usage is not compiled (or dynamically loaded) into the kernel, while certain advance security kernel extensions are compiled in for additional security. Unused binaries can be, for example, removed from user space. Optionally, libraries can be recompiled to their minimal required feature set with additional compile-time security features. Separate pools of COW (copy on write) filesystems are being used with read only continuous snapshotting and advance use of block level check summing and filesystem metadata semantics. This enables key features such as validation and recovery. In particular, the OS enables secure enclave backed device encryption which prevents key compromise even if the OS itself (including kernel) is compromised, as will be described below with reference to FIG. 2.

According to certain embodiments, the group of modules 120 can comprise at least one writer module 122 (also referred to herein as writer) and at least one reader module 124 (also referred to herein as reader). Each module within the group of modules can comprise a designated secure region to be executed within the protected memory. The group of modules are configured to create authentication and share the input data securely via a shared memory accessible thereto using a composite key, the composite key being generated within the group using a data sharing mechanism between the designated secure regions as enabled by the set of instructions, as will be described below in detail with reference to FIG. 2.

It is to be noted that these modules within the group should be broadly constructed to cover both system-level modules/processes as well as application-level modules/processes which can be operatively connected to each other and share data there between. The group of modules are illustrated in a general manner of layout for the purpose of describing functionalities thereof but are not intended to reflect actual system layers or structures thereof. It is to be appreciated that any suitable implementation of these modules in accordance with their properties and functionalities can be applied, and the present disclosure is not limited to a specific implementation.

Figure 2:
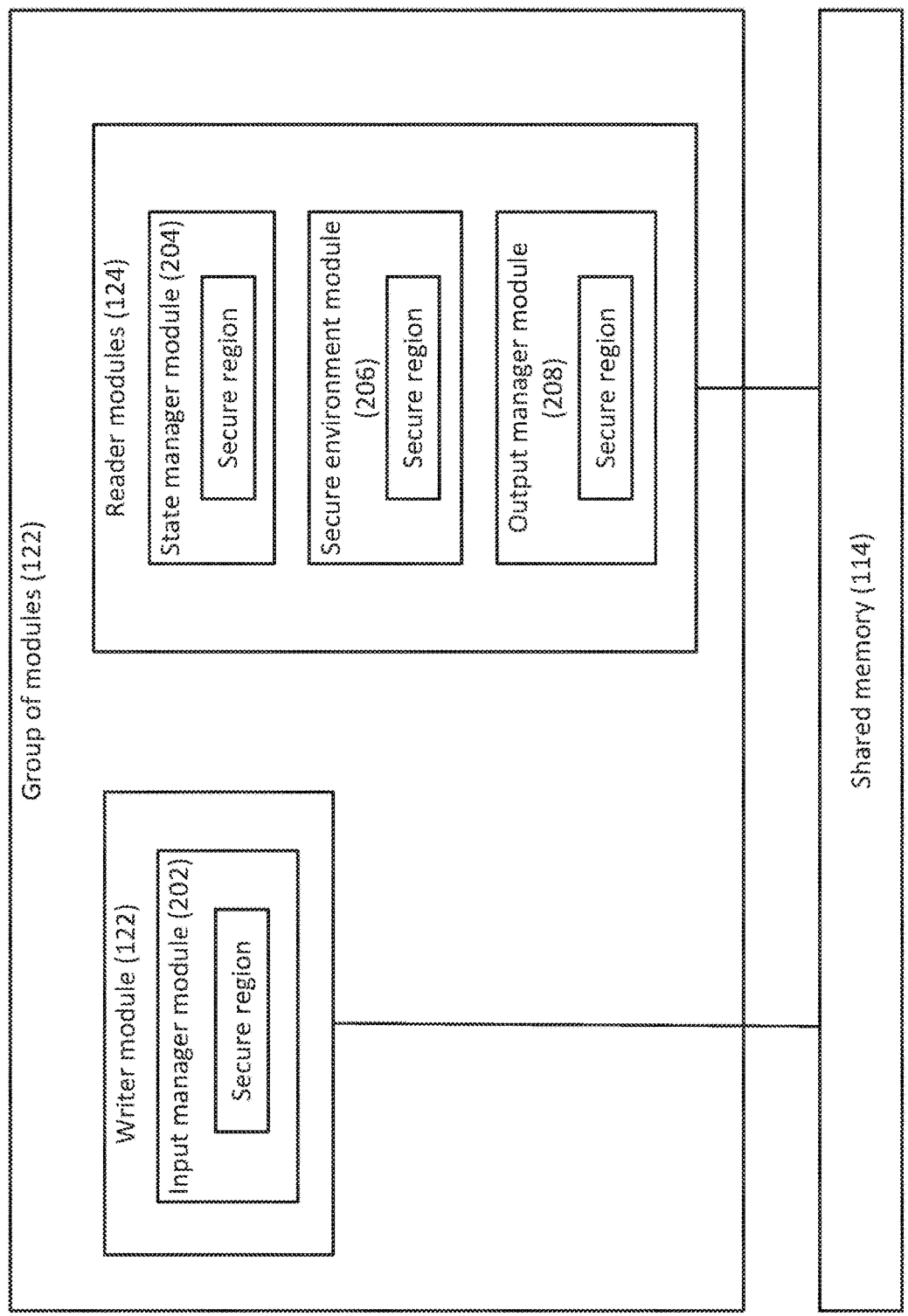
FIG. 2 illustrates a schematic and exemplified implementation of a group of modules in accordance with certain embodiments of the presently disclosed subject matter.

Bearing this in mind, reference is now made to FIG. 2, illustrating a schematic and exemplified implementation of a group of modules in accordance with certain embodiments of the presently disclosed subject matter.

As shown in FIG. 2, in one embodiment, the at least one writer module 122 can comprise an input manager module 202. The at least one reader module 124 can comprise one or more modules selected from a group comprising: a state manager module 204, a secure environment module 206, and an output manager module 208. Each module has a designated secure region (as illustrated in each module) embedded therein which provides a secure environment for the module to execute code and store data therein. The enclave can be executed within the protected memory. In the case of a platform supporting secure enclaves as described above, the secure region can refer to a secure enclave which is executed in the EPC region. As described above. EPC can be a protected region which is kept as a separate container, not accessible when execution is not inside of the enclave. When an enclave is entered, control can be transferred to the enclave code inside the EPC. SE instructions can provide access control mechanisms which ensure that enclave memory pages belonging to a given enclave (of a given module) cannot be read or written from outside the given enclave regardless of current privilege level and CPU mode (ring3/user-mode, ring0/kernel-mode, SMM, VMM or another enclave). Therefore, each module can securely protect its own code and data using a designated enclave which is not accessible to any other entity.

According to certain embodiments of the presently disclosed subject matter, the secure enclave mechanism as described above can be used to establish trust and authentication among the modules within the group, in addition to its original intent and usage of secure data protection.

Specifically, the group of modules can be configured to create authentication and share data (e.g., the input data) securely via a shared memory 114 accessible thereto using a composite key. According to certain embodiments, in the case of a secure enclave supporting platform, the composite key is generated by each module independently using respective key components contributed by each module in the group using sealing and unsealing mechanisms as provided by secure enclave instructions, as will be described below in further detail with reference to FIG. 4.

Figure 5:
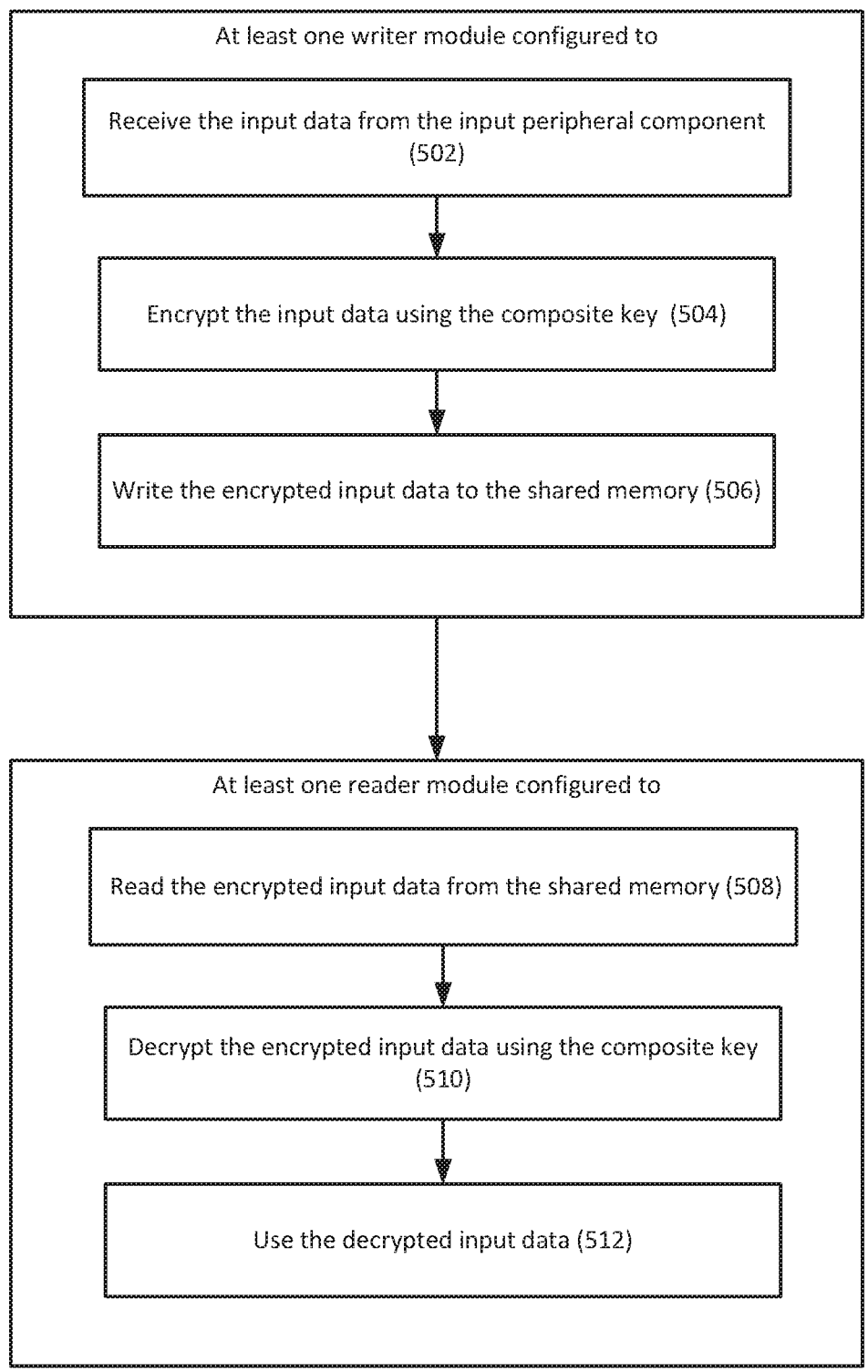
FIG. 5 illustrates a generalized flowchart of operations performed by the group of modules with respect to the shared memory in accordance with certain embodiments of the presently disclosed subject matter.

Having introduced the secure enclave mechanism which enables trust establishment, reference is now made to FIG. 5, illustrating a generalized flowchart of operations performed by the group of modules with respect to the shared memory in accordance with certain embodiments of the presently disclosed subject matter.

The shared memory is accessible to each of the modules in the group. The at least one writer module 122 can be configured to receive (502) the input data from the input peripheral component 104, encrypt (504) the input data using the composite key as generated in a process described with reference to FIG. 4 and write (506) the encrypted input data to the shared memory 114. In cases where the input data received from the input peripheral component 104 is secure input data (e.g., encrypted by the secure keyboard using, for example, a symmetric key), the writer module 122 can be configured to further decrypt the secure input data using the symmetric key shared with the secure keyboard, and re-encrypt the input data using the composite key and write the re-encrypted input data to the shared memory 114.

The at least one reader module 124 can be configured to read (508) data (e.g., the encrypted input data) from the shared memory, decrypt (510) the encrypted input data using the composite key and use (512) the decrypted input data.

As aforementioned, the at least one reader module 124 can comprise one or more modules selected from a group comprising: a state manager module 204, a secure environment module 206, and an output manager module 208. These reader modules can all read from the shared memory in the above described manner. In some cases, each of them can selectively read data that are directed/relevant to them. According to some embodiments, the state manager module 204 can be configured to read state information of the system so as to monitor state of environment in the operating system, e.g., whether the system is working in a secure environment or a virtualized local environment. In case of a switch of environment (e.g., from virtualized local environment to secure environment, or vice versa), the state manager module 204 can be configured to act as a coordinator between relevant modules and components, as will be described below with reference to FIG. 6.

The secure environment module 206 can be configured to read the encrypted input data (encrypted by the writer module, e.g., the input manager module 202) from the shared memory, decrypt the encrypted input data, transfer the input data securely through remote connection to a remote working environment, and receive processed. output data securely from the remote working environment. By way of example, the secure environment module 206 can be an application of a Remote Desktop (RDP) client which can be used to connect to a remote working environment, such as, e.g., a remote PC, a remote server, cloud, etc., where the input data are transferred and processed. Thus in some cases the secure environment module is also referred to as a remote environment module. The secure environment module 206 is a secure enclave aware runtime environment which utilizes the secure data sharing and protection mechanism as described above thereby maintaining a constantly-secured working environment.

The secure communication between the RDP client and the remote working environment can be implemented in various ways. For instance, encryption schemes such as, e.g., end-to-end encryption, TLS/SSL (Transport Layer Security/Secure Sockets Layer) encryption, one time password, and any other proprietary algorithms, etc. can be used. These encryption schemes can be used, by way of non-limiting example, for transport and/or payload encryption, etc. In some embodiments, a remote authentication process between the device and the remote entity can be established, which will be described below with reference to FIG. 7.

The output manager module 208 can be configured to provide the processed output data to the output peripheral component 106. By way of example, once the processed output data are received from the remote working environment by the RDP client, the RDP client can write the output data into the shared memory, and the output manager module 208 can read the output data therefrom and provide it to the output peripheral (e.g., to render for display, etc.). The implementation of such a secure output path will be described in detail below.

In such a secure working environment, once secure input data is received from the input peripheral component, this data can be shared securely among the group of modules (as enabled by the secure data sharing and protection mechanism based on secure enclaves) therefore ensuring an entire process from input to output being securely protected end-to-end, such protection being valid against kernel level/SMM/ME attacks.

Figure 4:
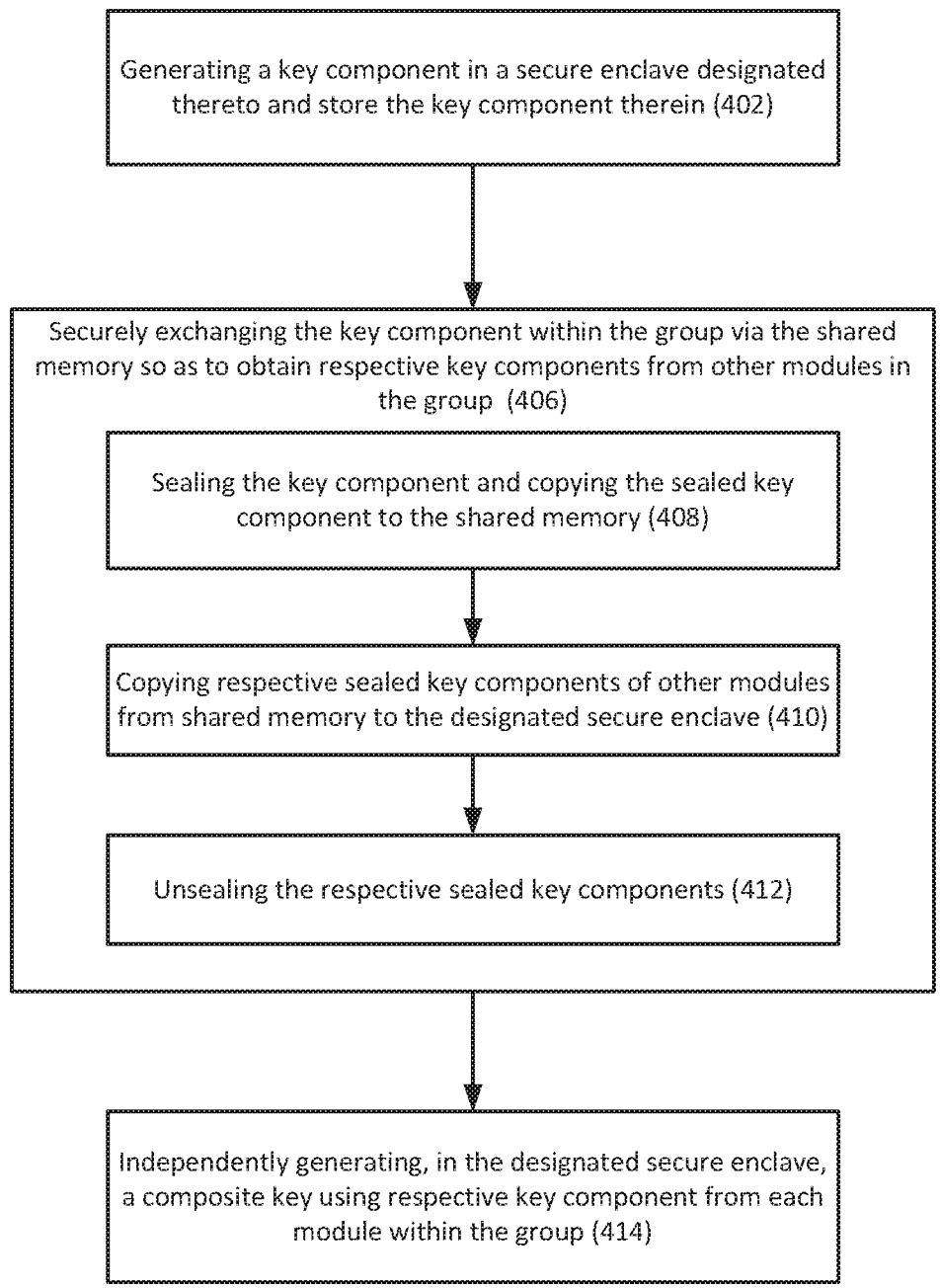
FIG. 4 illustrates a generalized flowchart of generating a composite key by each given module in the group of modules in accordance with certain embodiments of the presently disclosed subject matter.

Turning now to FIG. 4, there is illustrated a generalized flowchart of generating a composite key by each given module in the group of modules in accordance with certain embodiments of the presently disclosed subject matter.

As described above, each given module has a designated secure enclave embedded therein which provides a secure environment for the module to execute code and store data. Each given module in the group of modules can be configured to generate (402) a private key component for a specific session in its designated secure enclave and store the key component therein. The key component can be generated randomly, e.g., as an ephemeral nonce. Since the key component is generated and stored in the secure enclave, no other entities, other than the given module itself, can access this key information, due to the access control mechanisms provided by the SE instructions.

Each given module can securely exchange (406) its own key component within the group via the shared memory so as to obtain respective key components from other modules in the group. According to certain embodiments, this key exchange is enabled by using the sealing and unsealing mechanism of the secure enclave.

Sealing refers to the process of encrypting enclave data for persistent storage to the disk, so as to protect the confidentiality of the enclave data and to detect tampering when the enclave is loaded back into the EPC. This allows enclave data to be retrieved if the enclave is torn down e.g., due to a power event or by the application itself), and subsequently brought back up. Sealing, in a way, can be regarded as an encryption using a private sealing key that is unique to that particular platform and enclave, and is unknown to any other entity. There are different ways of sealing using different enclave identities. One of the identities associated with an enclave is the Signing identity provided by an authority entity (e.g., a developing company) which signs the enclave prior to distribution. This value is called MRSIGNER and will be the same for all enclaves signed with the same authority entity. Thus, it allows the same sealing key to be used for different enclaves, as long as these enclaves are all signed with the same authority entity.

According to certain embodiments of the presently disclosed subject matter, the secure enclaves designated to the multiple modules within the group are all signed by the same authority entity (e.g., the owner/producer of the modules) and are all associated with a signing identity of the authority entity. Enclave data of a given secure enclave sealed using the signing identity can only be successfully unsealed on the same platform by a valid and properly instantiated secure enclave that shares the same signing identity with the given secure enclave. Therefore, the sealing and unsealing mechanism using the signing identity can enable sharing of enclave data securely between multiple enclaves of different modules owned/produced by the same authority entity, therefore establishing hardware-based authentication and trust between the modules in the group.

Referring back to the secure exchange (406) of the key component as described above, specifically, one module (e.g., the writer module) within the group can act as a coordinator module for coordinating different phases/stages during the exchange process. In the first stage, each given module can seal (408) the key component and copy the sealed key component to the shared memory. Once all the sealed key components from all modules are copied to the shared memory, the coordinator module can inform the group of a stage change, and each given module can be configured to copy (410) respective sealed key components of other modules from the shared memory to its own designated secure enclave, and unseal (412) the respective sealed key components in the designated secure enclave. A successful unsealing of the sealed key components by the given component proves that it is a valid, trusted and untampered entity.

Once all the key components from all other modules in the group are successfully unsealed, each given module can independently generate (414), in its designated secure enclave, a composite key using a respective key component from each module within the group. It is to be noted that the composite key has to be derived from all the key components of all the modules in the group. Each active participating module is required to contribute a key component to be used for creating the composite key, thereby preventing possible replay attacks. It is also to be noted that each module generates the composite key using key components of other modules as copied from the shared memory, and its own key component as locally stored.

Once independent generation of the composite key is completed by each module, the coordinator module can inform the group of a stage change, and the group can start secure data communication within the group by using the composite key, as described above with reference to FIG. 5. In one embodiment, the writer module can encrypt data using the composite key generated by itself and write the encrypted data to the shared memory. If a reader module, when reading the encrypted data from the shared memory, can use the self-generated composite key to successfully decrypt the encrypted data, this necessarily indicates that its own key component was used in generating the composite key, which provides verification of the validity and security of the other module.

In particular, it is to be noted that in the presently disclosed subject matter, the sealing and unsealing mechanism using the signing identity is used to establish trust and security, rather than just sharing data. By successfully sending sealed data and examining the new encrypted data (using the composite key), a successful unseal operation can be deducted. The notion of deducting a successful seal/unseal operation on all participating modules is the trust that is created, because only valid, trusted, and untampered enclaves are able to do this. Therefore, a hardware anchor to this trust is established.

According to certain embodiments, the number of participating modules in the group of modules is not restricted or predefined. At any given time, a new module can join the group, upon which a new composite key is generated (as requested by the new joining module) from all current participating modules, in a similar process as described above, effectively validating the status of all the participants, as well as preventing replay attacks. The key re-generation is also referred to as key refresh or key rollover. By way of example, if the new joining module, after generating independently the new composite key, can read data successfully using the new composite key, this means the key exchange between the new module and the rest of the members is successful, and only its key component is used in the new composite key. By way of another example, if the new joining module, after generating independently the new composite key, receives from an untrusted entity a playback memory which used an older key, the new joining module will be able to verify that it is not from a valid and trusted entity. By way of yet further example, upon a key change, the writer module can inspect the provided key components from the modules and verify which modules are currently alive.

In some embodiments, the composite key can also be required to be repeatedly regenerated every given interval of time, for the purpose of enforcing key freshness and avoiding key wear-out. Optionally, the policy/algorithm used to generate the composite key based on the key components can also vary and can be selected from a set of predefined options, which provides additional security protection, since even if the key components remained unchanged, the actual composite key resulted therefrom may be different. At any given time, an existing member module can leave the group without affecting the current composite key.

According to certain embodiments, in addition to the new joining module replay protection as described above, there is also provided an on-going replay protection. By way of example, the writer module, as the provider, can use a session monotonic counter which will start at the beginning of a writing session and will continuously increment this counter as new data units are provided. The monotonic counter is a per data unit/element counter. The reader modules, as consumers, can read this counter value when they read the data and can store this value locally. Since this counter value is expected to only advance forward, if a value currently read by a reader module is lower than the previously stored value, the reader module can assume there is a compromise in the data. Additionally, reader modules continuously keep track of the session monotonic counter. A valid increment counter can be an indication of a valid writer module.

Figure 3:
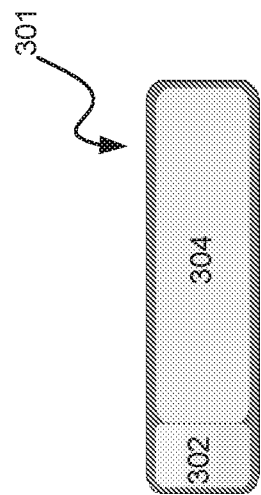
FIG. 3 illustrates a schematic representation of the data structure of the shared memory in accordance with certain embodiments of the presently disclosed subject matter.
Figure 3:
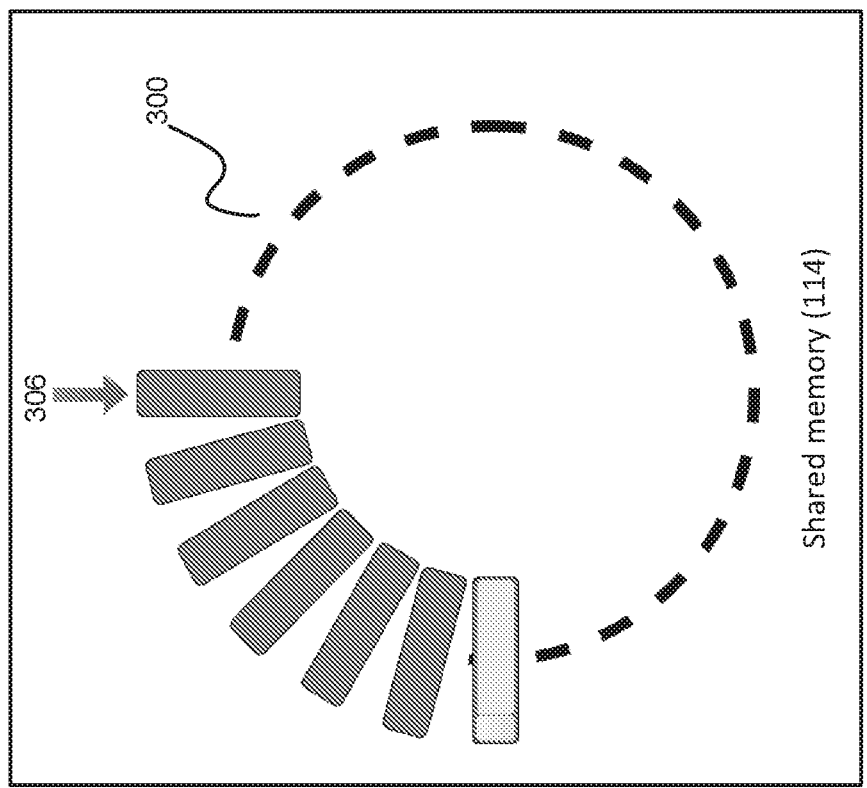

Turning now to FIG. 3, there is illustrated a schematic representation of a data structure of the shared memory in accordance with certain embodiments of the presently disclosed subject matter.

The shared memory 114 is representatively illustrated, by way of non-limiting example, as a data structure of a secure ring cache 300 (it is to be noted that since memory is never physically created as a ring, the ring cache 300 is illustrated for representative purposes only. A linear representation with equivalent functionality as described herein can be used in implementation. It is noted that in some embodiments an implementation of a ring cache should implement protection against overflow). In some embodiments, a different data structure, such as a suitable data structure which supports multiple readers and multiple writers, and wherein reading the data does not cause it to be deleted, can be used.

The ring structure does not have a real starting point or end point and data can loop around the ring. The basic data element stored in the ring cache is illustrated as a data packet 301 which comprises metadata 302 and payload 304. The metadata and the payload can be both encrypted, or alternatively only the payload is encrypted. The metadata 302 can include overhead information such as, e.g., descriptor, timestamp, packet counter, etc. The payload 304 contains the actual data being carried. Data packets can vary in structure and functionality depending on the protocols implementing them. Data packets are only read but not consumed (i.e., deleted). When a full circle has been reached, the oldest data packets will be overwritten. The ring cache can be built in a way that it is big enough so readers can have ample time to read data before it is overridden. In one embodiment, the ring cache can be sized to accommodate 100-200 keystrokes. It is to be noted that the ring cache size can vary, depending on factors such as, e.g., input type and throughput. In cases where the input peripheral is, e.g., a microphone, the ring cache can be sized in terms of time units.

According to certain embodiments, in addition to the data packets, the ring cache can carry global data comprising: writer data (including, e.g., last write position 306, and writer active flag, etc.), reader data (including e.g., reader active flags etc.), encryption handling data (including sealed key components, key rollover flags etc.), and ring metadata.

As described, there is provided a marker indicative of the last write position 306 (as part of the writer data). The last write position is updated by the writer at the end of every write state. The writer marker is a public value representing the last write position. The writer updates it after every write action. Every reader can independently track this value to keep track of the writer actions.

Each reader independently reads the data without affecting others. Each reader can individually follow the writer and decide what and how much new data was written since its last read, e.g., by tracking the last read position. The last read position is a private value representing the position this specific reader has last read. It is not public and is maintained internally within each reader module. When a reader joins the group, it records the last write position as its last read position and starts tracking the writer. When the reader reads at a new time, it compares the internally saved last read position to the current public last write position, and if they are not equal, the difference in count reflects the new writes that the writer made from the last read. While reading, each reader can decide to read some or all new data packets that were written since the last read.

In some embodiments, the writer and readers can be regarded as loosely coupled to each other in the data sharing system via the shared memory. The writer can write data continuously and independently of the readers, while the readers can read data continuously and independently of other readers. This can be achieved by using memory access state (also referred to as mode) switching, thereby avoiding using any lock mechanism for synchronization, as illustrated in FIG. 8 in accordance with certain embodiments of the presently disclosed subject matter.

Figure 8:
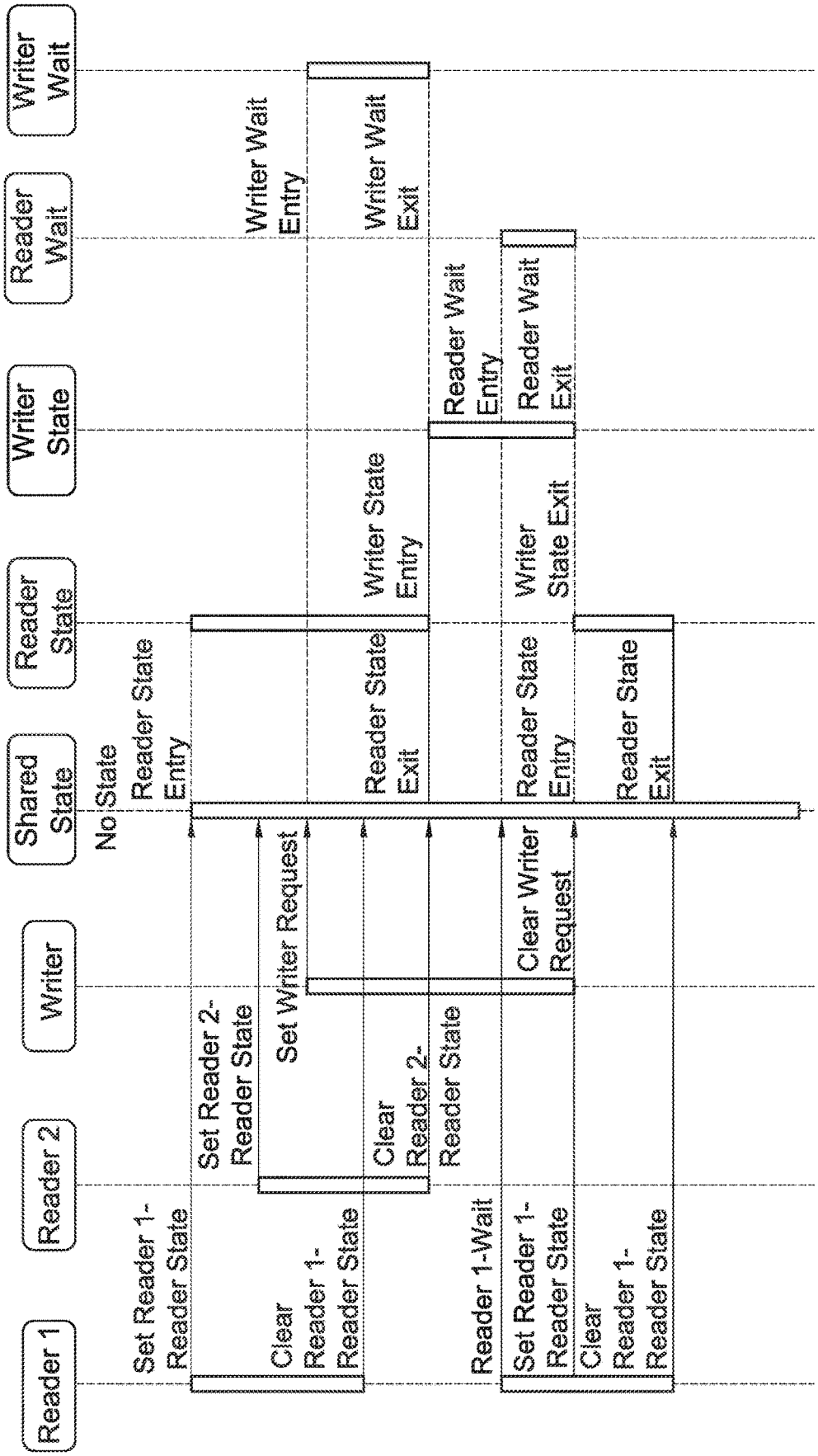
FIG. 8 illustrates a schematic illustration of memory access state switching between writer and reader modules in accordance with certain embodiments of the presently disclosed subject matter.

The followings states as illustrated in FIG. 8 can be used:
Initial State
    Currently, not in Reader or Writer state
Reader State
    Any reader can initiate state change to reader state.
    Actual state change will occur immediately if not in writer state, or after change to Initial State
    In case the Writer Request flag is up, new readers will wait until Writer State has been completed.
    More than one reader can initiate the change simultaneously, or one after the other: Reader State will change back to Initial State after last reader has completed.
    Readers are independent and do not interfere with each other; they coordinate with the writer only.

Reader Wait State
  New Readers that encounter the writer flag enter wait state so the writer can complete its work.
Writer State
  Writer can request a change to Write State at any time by signaling with the Writer Request flag; actual state change will occur when all active readers have completed and state is changed to Initial State.
Writer Wait State
  Write will wait for all active readers to complete before entering Write State.

Writer can write 0, 1 or more data packets at every write state. Readers can read 0, 1 or more data packets at every read state, assuming that amount of new data is available. When entering reader state/mode, readers can create a timestamp. Before entering read mode, readers check the timestamp, if the max time for state has been reached, readers will wait to allow writer to enter write state and prevent writer starvation. Multiple readers can start reading at the same time, either by changing to read state or by continuing the read state, as long as the writer is not waiting to write.

In some embodiments, there can be multiple writers writing in the ring cache. By way of example, there can be two input manager modules, each operatively connected to a respective input peripheral component. The two input peripherals can be either of the same kind (e.g., two keyboards), or of different kinds (e.g., one keyboard, and one mouse). In such cases, each data packet should include extra meta data indicating the writer origin.

It is to be noted that the above described ring data structure, its functionality, as well as the writer and reader behaviors in connection therewith, are illustrated for exemplified purposes and should not be construed to limit the present disclosure in any way. Any other suitable data structure and/or participant behaviors can be applied in lieu of or in addition to the above.

Figure 6:
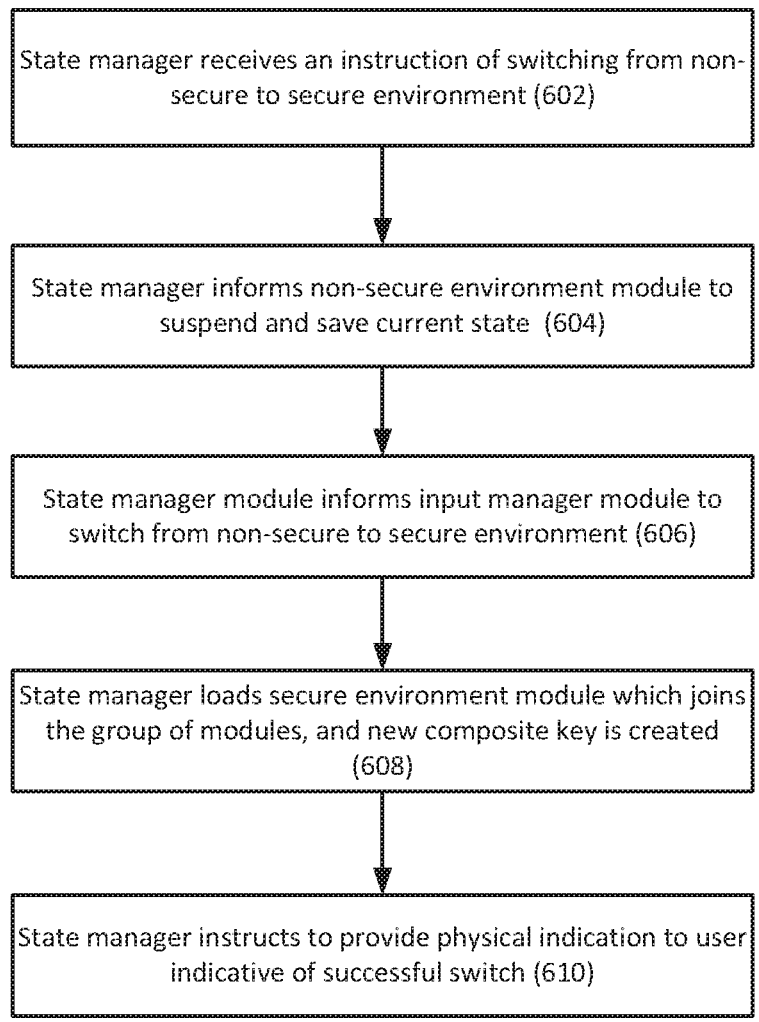
FIG. 6 illustrates a generalized flowchart of switch of environment in the operating system in accordance with certain embodiments of the presently disclosed subject matter.

Reference is now made to FIG. 6, illustrating a generalized flowchart of switch of environment in the operating system in accordance with certain embodiments of the presently disclosed subject matter.

In some embodiments, except for a secure environment which is provided when the secure environment module 206 is up and running using the above described secure data sharing and protection mechanism, there can be also a virtualized local environment module (not shown in the figures) executable by the operating system of the secure computer device. This module provides the user with an unmodified third party operating system (e.g., a VM of Windows, Linux, or any other proprietary or legacy OS, etc.). There can be possibly multiple instances of this component, all running different versions, different applications with varying levels of hardware emulation, connectivity and attachments.

This module is relatively less secure as compared with the secure environment module as described above, in the sense that it is not a secure enclave aware environment and therefore the secure data sharing and protection mechanism as described above is not provided in this environment. The virtualized local environment module and the secure environment module are cryptographically separated from each other and can be executed with mutual exclusion. It is further noted that in the secure environment, persistent data is stored remotely, whereas in the virtualized local environment such data is encrypted and stored on the local disk. In this context, "persistent data" can exclude transient data— such as data available momentarily during the process of displaying it.

Upon the operating system being booted, the user can be presented with a unified user interface to connect to either of the two environments. At this time, there can be, for example, two modules miming in the system, the input manager module and the state manager module, which together constitute the group of modules. These two modules can agree on a composite key as described above, and start sharing data using the key via the shared memory (e.g., the secure ring cache). Assuming an instruction is now received from the user to enter the virtualized local environment (e.g., Windows VM), the virtualized local environment module is up and running. It is noted that even in a virtualized local environment, the secure ring cache is still operating in the above described manner but is not accessible to the virtualized local environment module, e.g., the Windows VM, When working in the virtualized local environment, the input manager module can continuously send encrypted data (for example: to the secure remote working environment 700) in order to prevent side-channel attacks.

Upon receiving (602) an instruction from the user to switch from the virtualized local environment to secure environment, the state manager, who is reading data from the ring and monitoring the state of the environment, can instruct (604) the virtualized local environment module to suspend and save the current state. In some embodiments, the instruction of switching between environments can be given by a user through a physical switch that is embedded/integrated on the secure computer device, such as, e.g., a button, or a switch button on the keyboard, or through a physical component (e.g., a physical indicator) that can additionally provide physical indication upon a successful switch, as described below. The secure switch can be implemented using a secure driver, either through an existing module within the group of modules, or through a designated module with a designated secure enclave. In some other embodiments, the instruction of switching between environments can be given by using a keystroke combination through the keyboard. Upon receiving the instruction from the state manager, the VM manager of the Windows VM (for example) can take a snapshot of the current state which can be stored and later used to revert back to a specific point-in-time. The state manager module then instructs (606) the input manager module to switch from non-secure to secure environment. The input manager module, upon receiving the instruction from the state manager, will stop sending simulated non-secure input data to Windows VM.

The state manager module also loads (608) the secure environment module (e.g., the RDP client) which joins the group of modules as a new member, thus triggering a key rollover. A new composite key can be generated among the group of modules (e.g., the secure environment module, the input manager module and the state manager module) and used for subsequent secure data sharing within the group. Upon a successful switch being completed, the state manager can instruct (610) to give a physical indication to the user that the switch is successfully completed. By way of example, a physical component/indicator embedded on the secured computer device, such as, e.g., a visual indicator, LED, or a sound indicator (e.g., vibrator), etc. that can be installed on the keyboard or any other suitable component of the computer device, can give a physical indication upon receiving a notification of a successful switch, by way of, e.g., light, mini-screen, buzz, sound, etc., so that the user gets an indication that the switch actually took place. This can effectively provide protection against a malicious component attempting to fake a switch, thus taking over control of the system.

Figure 7:
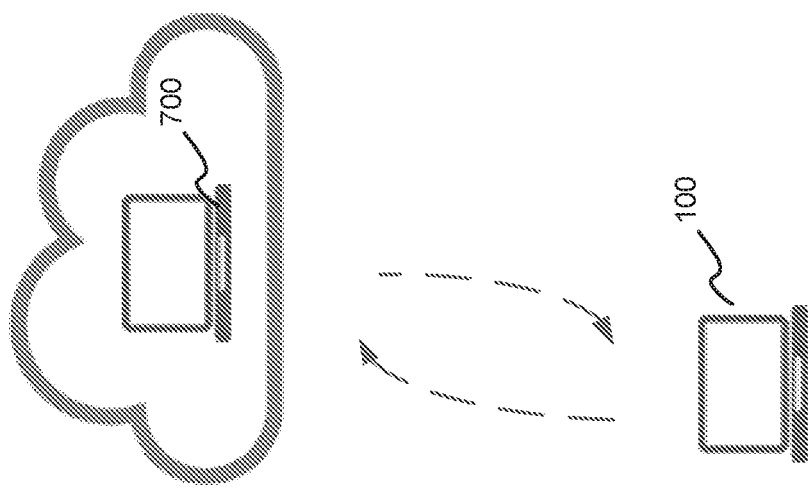
FIG. 7 illustrates a schematic illustration of a secure cloud environment in accordance with certain embodiments of the presently disclosed subject matter.

Turning now to FIG. 7, there is illustrated a schematic illustration of a secure cloud environment in accordance with certain embodiments of the presently disclosed subject matter.

Currently there are very few cloud solution vendors who offer true zero-knowledge, i.e., sensitive data, such as, e.g., encryption keys as provided by the user, which are not known to the vendors. Within the few existing solutions, zero-knowledge may be provided only in a limited subset of applications (e.g., secure file storage, secure email, etc.). With most cloud providers, certainly those who offer virtual computing, the user is forced to blindly trust the vendor and the hypervisor the software stack in charge of virtualization). Trusting the hypervisor is a critical security drawback. A virtualized operating system running in a cloud provider, along with all of its memory space (regardless of privilege separation within the user), running processes, data, etc., is completely transparent to the hypervisor. Malicious activities, such as, e.g., a malicious employee working for the cloud provider, a subpoena served to the provider, a compromise at the hypervisor level or cross VM compromise, all put the client's VM (and data) at great risk.

Using the secure computer system as described above, which is equipped with secure working environment and end-to-end data protection, as enabled by the secure data sharing and protection mechanisms, a true zero-trust cloud environment can be realized. In some embodiments, the user can provide all system configuration and user information in a consolidated file (e.g., a ISO file), which can be used to install and customize a secure computer device 700 as per the user's request, at a secure physical environment. It is to be noted that such a secure computer device has already been pre-configured to enable the secure data sharing and protection schemes, as described above. Once the secure computer device 700 is customized and closed, a physical tamper resistant measure can be used to prevent the computer device from being opened again, by way of e.g., using hardware switches. This secure computer device 700 can be then placed into the cloud and can be used to provide a secure remote working environment to the user. No entity from the cloud provider can tamper with the device or access the data stored therein, or the computations done on that data. The user, located anywhere in the world, can use a local secure computer (e.g., a secure computer system 100) to connect to the secure computer device 700 using his private credentials as previously configured. In addition, the remote computer can be used to connect to other computers in the cloud thus forming a network of inter-connected remote computers that serve as an organizational network with end users accessing it using the computer system 100.

A secure communication between the local secure computer 100 and the secure remote working environment 700 can be implemented in various ways. There is now described an exemplified way of establishing a remote authentication between the local device and the remote entity in accordance with certain embodiments of the presently disclosed subject matter. Any other known or proprietary protocols, such as, TLS/SSL, VPN, RDP, etc. can be used for establishing remote authentication and/or enabling the secure communication between local device and the remote entity.

At device creation, a pre-shared secret between the client 100 and the server 700 is sealed thus avoiding the need for remote attestation. This can be done at a defined secure safe production environment, where it is assumed no system is compromised and device provisioning can be performed without any risk of malicious software or other security risk.

Specifically, a unique certificate that can recognize this specific device to the server can be created. This specific device's public certificate can be saved on the server. On the device, this specific device's certificate (public and private keys), and the server's public certificate, can be saved. This information can then be sealed (for example: using a secure enclave specific sealing mechanism), meaning only this specific device can unseal this information and only on a properly instantiated secure enclave signed by a trusted entity. Tampering with the device, changing its hardware properties, editing or deleting the sealed data, will break the sealing and fail the device authentication. Without this data, this device is assumed compromised, cannot be used, and will need to be re-provisioned with new identification at the secure production environment.

An exemplified, remote authentication flow can be performed as follows: When negotiating remote security, after establishing an encrypted channel, the client can unseal the authentication data, and authenticate the server using the saved server certificate. If authenticated, the client can send the server this device specific signed certificate for validation. A server that receives the right signed certificate can assume that the data was properly unsealed, which can only be done on the right device with the properly instantiated secure enclave. The above authentication process is assumed to be as secure as remote attestation, as Intel proposed. In addition, it provides a simple and safe way for two way remote authentication, and does not require special servers or registering and using the attestation service. This also provides the option of disabling a specific device if assumed compromised, since each device is authenticated and recognized individually.

According to certain embodiments, a ring data structure, similar to the implementation of the secure ring cache 300 which is used to securely share input data between the group of modules as described above with reference to FIG. 3 and FIG. 5, can be used to securely share processed output data among relevant entities and modules thus forming a secure output path to transfer to the output data. In one embodiment, a second ring cache can be created in a similar implementation mechanism and can be used among a second group of modules that are relevant for outputting the processed data. The second group of modules can at least include, for instance, the RDP client module which can serve as the writer module for receiving the processed data from the remote environment and writing to the second ring cache, and the output manager module which can serve as one of the reader modules for reading the processed data from the second ring cache. There can be possibly other modules participating in the second group. In another embodiment, the same secure ring cache 300 may be used for sharing both input and output data, in which case there can be possibly two or more writers (e.g., the input manager module and the RDP client) that write to the ring and thus should be coordinated. The present disclosure is not limited by the specific implementation thereof.

It is to be noted that the examples shown in the figures and described above are only for illustrative purposes and should not be deemed to limit the present disclosure in any way. Anyone skilled in the art would readily appreciate that any other suitable implementations or illustrations can be used in addition or in lieu of the illustrated examples.

It is also noted that whilst the flow charts illustrated in in FIGS. 4-6 are described with reference to elements of system 100, this is by no means binding, and the operations can be performed by elements other than those described herein.

It is to be understood that the invention is not limited in its application to the details set forth in the description contained herein or illustrated in the drawings. The invention is capable of other embodiments and of being practiced and carried out in various ways. Hence, it is to be understood that the phraseology and terminology employed herein are for the purpose of description and should not be regarded as limiting. As such, those skilled in the art will appreciate that the conception upon which this disclosure is based may readily be utilized as a basis for designing other structures, methods, and systems for carrying out the several purposes of the presently disclosed subject matter.

It will also be understood that the system according to the invention may be, at least partly, implemented on a suitably programmed computer. Likewise, the invention contemplates a computer program being readable by a computer for executing the method of the invention. The invention further contemplates a non-transitory computer-readable storage medium tangibly embodying a program of instructions executable by the computer for executing the method of the invention.

Those skilled in the art will readily appreciate that various modifications and changes can be applied to the embodiments of the invention as hereinbefore described without departing from its scope, defined in and by the appended claims.

The invention claimed is:

1. A secured computer system, comprising:
  a processor and memory unit (PMU) operatively connected to an input peripheral component and an output peripheral component, wherein:
    the input peripheral component is configured to receive input data from a user and send the input data to the PMU;
    the output peripheral component is configured to receive processed output data from the PMU;
    the PMU comprises a system memory comprising a protected memory and a shared memory, and a processor operatively coupled to the system memory, the processor including a set of instructions for enabling secure data storage and execution via the protected memory;
  the PMU further comprises an operating system and a group of modules executable by the operating system, each module in the group of modules having a designated secure region to be executed within the protected memory, the group of modules configured to create authentication and share the input data securely via the shared memory accessible thereto using a composite key, the composite key generated within the group using a data sharing mechanism between the designated secure regions enabled by the set of instructions;
  wherein the processor supports secure enclaves and the set of instructions includes a plurality of secure enclave instructions, and wherein the designated secure region is a secure enclave, and each given module in the group is configured to generate the composite key by:
    generating a key component for a specific session in a secure enclave designated thereto and storing the key component in the designated secure enclave;
    securely exchanging, using sealing and unsealing mechanism of the secure enclaves, the key component within the group via the shared memory so as to obtain respective key components from other modules in the group; and
    independently generating, in the designated secure enclave, the composite key using respective key component from each module within the group, thereby allowing secure data communication within the group by using the composite key;
  wherein the group of modules comprises:
    at least one writer module configured to receive the input data from the input peripheral component, encrypt the input data using the composite key and write the encrypted input data to the shared memory; and
    at least one reader module configured to read the encrypted input data from the shared memory, decrypt the encrypted input data using the composite key and use the decrypted input data.

2. The secured computer system of claim 1, wherein the at least one reader module is selected from a group comprising:
  a state manager module configured to monitor state of environment in the operating system;
  a secure environment module configured to transfer the input data securely through remote connection to a remote working environment and receive processed output data securely from the remote working environment; and
  an output manager module configured to provide the processed output data to the output peripheral component.

3. The secured computer system of claim 1, wherein the designated secure enclaves are associated with a signing identity of an authority entity that signs the secure enclaves, and wherein each given module in the group is configured to securely exchange the key component by: sealing the key component and copying the sealed key component to the shared memory, copying respective sealed key components of other modules from the shared memory to the designated secure enclave, and unsealing the respective sealed key components, wherein a successful unsealing operation by the given module provides validity authentication.

4. The secured computer system of claim 3, wherein the at least one writer module is further configured to coordinate phases during generating the composite key.

5. The secured computer system of claim 1, wherein the input peripheral component is a secure keyboard configured to receive and encrypt input key strokes from the user and send the encrypted input data to the PMU.

6. The secured computer system of claim 1, wherein the output peripheral component is a secure display configured to receive encrypted processed output data from the PMU and decrypt the encrypted processed output data to render for display.

7. The secured computer system of claim 1, wherein the shared memory is represented by a secure ring cache in which each module in the group independently accesses therefrom.

8. The secured computer system of claim 1, wherein a new composite key is generated upon a new module joining the group or upon lapse of a period of time.

9. The secured computer system of claim 1, wherein the at least one writer module is configured to use a session monotonic counter whose value is expected to advance forward only when writing new input data, and each of the at least one reader module is configured to store a local copy of the session monotonic counter on every reading session and upon a new reading session, read a current value of the session monotonic counter and compare with a previous stored value.

10. The secured computer system of claim 1, wherein the composite key is verified by a given module upon a successful read of the given module from the shared memory using the composite key.

11. The secured computer system of claim 1, further comprising a virtualized local environment module executable by the operating system, wherein state of the operating system is switchable between a secure environment provided by the secure environment module and a virtualized local environment provided by the virtualized local environment module.

12. The secured computer system of claim 11, further comprising a physical indicator embedded on the secured computer device and configured to provide a physical indication upon a switch between the virtualized local environment and the secure environment.

13. The secured computer system of claim 12, wherein the physical indicator is a visual indicator embedded on the input peripheral component and configured to give visual indication upon receiving a notification of a successful switch.

14. The secured computer system of claim 11, further comprising a physical switch embedded on the secured computer device configured to receive an instruction of switching environment from a user, and trigger a switch between the virtualized local environment and the secure environment.

15. The secured computer system of claim 1, further comprising a BIOS component configured to perform verification in order to determine whether or not to boot the operating system.

16. A secured computer system, comprising:
a processor and memory unit (PMU) operatively connected to an input peripheral component and an output peripheral component, wherein:
the input peripheral component is configured to receive input data from a user and send the input data to the PMU;
the output peripheral component is configured to receive processed output data from the PMU;
the PMU comprises a system memory comprising a protected memory and a shared memory, and a processor operatively coupled to the system memory, the processor including a set of instructions for enabling secure data storage and execution via the protected memory;
the PMU further comprises an operating system and a group of modules executable by the operating system, each module in the group of modules having a designated secure region to be executed within the protected memory, the group of modules configured to create authentication and share the input data securely via the shared memory accessible thereto using a composite key, the composite key generated within the group using a data sharing mechanism between the designated secure regions enabled by the set of instructions;
wherein the group of modules comprises:
at least one writer module configured to receive the input data from the input peripheral component, encrypt the input data using the composite key and write the encrypted input data to the shared memory; and
at least one reader module configured to read the encrypted input data from the shared memory, decrypt the encrypted input data using the composite key and use the decrypted input data,
wherein the at least one reader module is selected from a group comprising:
a state manager module configured to monitor state of environment in the operating system;
a secure environment module configured to transfer the input data securely through remote connection to a remote working environment and receive processed output data securely from the remote working environment; and
an output manager module configured to provide the processed output data to the output peripheral component.

17. The secured computer system of claim 16, wherein the processor supports secure enclaves and the set of instructions includes a plurality of secure enclave instructions, and wherein the designated secure region is a secure enclave.

18. The secured computer system of claim 16, wherein the at least one writer module is configured to use a session monotonic counter whose value is expected to advance forward only when writing new input data, and each of the at least one reader module is configured to store a local copy of the session monotonic counter on every reading session and upon a new reading session, read a current value of the session monotonic counter and compare with a previous stored value.

19. The secured computer system of claim 16, further comprising a virtualized local environment module executable by the operating system, wherein state of the operating system is switchable between a secure environment provided by the secure environment module and a virtualized local environment provided by the virtualized local environment module.

20. A secured computer system, comprising:
a processor and memory unit (PMU) operatively connected to an input peripheral component and an output peripheral component, wherein:
the input peripheral component is configured to receive input data from a user and send the input data to the PMU;
the output peripheral component is configured to receive processed output data from the PMU;
the PMU comprises a system memory comprising a protected memory and a shared memory, and a processor operatively coupled to the system memory, the processor including a set of instructions for enabling secure data storage and execution via the protected memory;
the PMU further comprises an operating system and a group of modules executable by the operating system, each module in the group of modules having a designated secure region to be executed within the protected memory, the group of modules configured to create authentication and share the input data securely via the shared memory accessible thereto using a composite key, the composite key generated within the group using a data sharing mechanism between the designated secure regions enabled by the set of instructions;
wherein the group of modules comprises:
at least one writer module configured to receive the input data from the input peripheral component, encrypt the input data using the composite key and write the encrypted input data to the shared memory; and
at least one reader module configured to read the encrypted input data from the shared memory, decrypt the encrypted input data using the composite key and use the decrypted input data;

wherein the system further comprises a virtualized local environment module executable by the operating system, wherein state of the operating system is switchable between a secure environment provided by the secure environment module and a virtualized local environment provided by the virtualized local environment module.

* * * * *